(12) United States Patent
Sims et al.

(10) Patent No.: US 8,699,243 B2
(45) Date of Patent: Apr. 15, 2014

(54) POWER CONVERTER SYSTEM WITH SYNCHRONOUS RECTIFIER OUTPUT STAGE AND REDUCED NO-LOAD POWER CONSUMPTION

(75) Inventors: Nicholas A. Sims, San Francisco, CA (US); Jeffrey J. Terlizzi, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 219 days.

(21) Appl. No.: 13/284,663

(22) Filed: Oct. 28, 2011

(65) Prior Publication Data

US 2013/0107585 A1 May 2, 2013

(51) Int. Cl.
*H02M 3/335* (2006.01)

(52) U.S. Cl.
USPC .................................. 363/21.14; 363/21.15

(58) Field of Classification Search
USPC .................. 363/15–17, 20, 21.01, 21.14–18
See application file for complete search history.

(56) References Cited

U.S. PATENT DOCUMENTS

| | | | |
|---|---|---|---|
| 7,161,813 B2 | 1/2007 | Librizzi et al. | |
| 7,385,832 B2 * | 6/2008 | Allinder | 363/21.14 |
| 7,501,715 B2 | 3/2009 | Saeueng et al. | |
| 7,791,910 B2 | 9/2010 | Pwu et al. | |
| 7,936,575 B2 * | 5/2011 | Hu | 363/21.06 |
| 2009/0161390 A1 | 6/2009 | Huang | |
| 2010/0039735 A1 | 2/2010 | Trescases et al. | |

FOREIGN PATENT DOCUMENTS

JP 2001292573 10/2001

OTHER PUBLICATIONS

Application Note, "A High Efficiency Synchronous Rectifier Flyback for High Density AC/DC Adapter," Jacky Zhang, Jimmy Liu, and Lu Bing, Texas Instruments, Aug. 2011.*
Application Note "Synchronous Rectification Controller for Flyback and Forward Freewheeling Rectification," Fairchild Semiconductor Corporation, Rev. 1.0.0, Jul. 2011.*
Data Sheet, "Synchronous Rectification Controller for Flyback and Forward Freewheeling Rectification," Fairchild Semiconductor Corporation, Rev. 1.0.0, Nov. 2010.*
"Green Current Mode PWM Controller FAN7601", Fairchild Semiconductor Corporation, May 22, 2003.

* cited by examiner

*Primary Examiner* — Adolf Berhane
*Assistant Examiner* — Jye-June Lee
(74) *Attorney, Agent, or Firm* — Womble Carlyle Sandridge & Rice LLP (57) ABSTRACT

A power converter circuit may convert alternating current signals into direct current signals. A load may be powered from output terminals that are provided with the direct current signals. The power converter circuit may have a transformer with primary and secondary sides. A transistor on the primary side may be controlled using a pulse width modulation controller. A diode may be coupled in series with the secondary side of the transformer and the load. To improve efficiency at larger load currents, a synchronous rectifier control circuit may modulate a transistor on the secondary side that is coupled in parallel with the diode. The synchronous rectifier control circuit may monitor voltage pulses on the transistor on the secondary side or may make direct load current measurements to ascertain how much load current is flowing. Under low or no load conditions, synchronous rectification can be inhibited to improve efficiency.

20 Claims, 6 Drawing Sheets

FIG. 8

POWER CONVERTER SYSTEM WITH SYNCHRONOUS RECTIFIER OUTPUT STAGE AND REDUCED NO-LOAD POWER CONSUMPTION

BACKGROUND

This invention relates to power converters, and, more particularly, to power converters with synchronous rectifier output stages.

Alternating current (AC) power is typically supplied from wall outlets and is sometimes referred to as line power. Electronic devices often include circuitry that runs from direct current (DC) power. AC to DC power converter circuitry can be used to convert AC power to DC power. The DC power that is created in this way may be used to power an electronic device that runs on DC power. The DC power that is created may also be used to charge a battery in an electronic device.

AC to DC power converters often include transformers. A transformer in an AC to DC power converter may have primary and secondary windings. A pulse width modulation (PWM) circuit on the primary side of a transformer may generate pulses of current that pass through the primary winding of the transformer. On the secondary side of the transformer, a diode may be used to rectify the output of the secondary winding.

Some AC to DC power converter circuits use synchronous rectifier (SR) output stages. SR output stages include a metal-oxide-semiconductor field-effect transistor (MOSFET). The MOSFET is driven so as to rectify the output waveform from the transformer in the same way that the diode is used in other power converter designs while avoiding high diode voltage drops when conducting current.

The use of SR output stages may improve efficiency at high loads, but can lead to undesired switching losses at lower loads. It would therefore be desirable to be able to improve power converter circuits such as power converter circuits with SR output stages.

SUMMARY

A power converter circuit may convert alternating current signals into direct current signals. The power converter circuit may use a switched mode power supply configuration such as a flyback converter configuration. The alternating current side of the converter may receive alternating current power from an alternating current source such as a wall outlet. The direct current side of the converter may supply a direct current power supply voltage across a pair of output terminals.

A load may be powered from the output terminals that are provided with direct current signals. The power converter circuit may have a transformer having primary and secondary sides. The primary side may be coupled to the alternating current power source. The secondary side may be coupled to the output terminals and the load.

A transistor on the primary side may be controlled using a pulse width modulation controller. Feedback circuitry may be used to route information on an output voltage on the output terminals to the pulse width modulation controller.

A diode may be coupled in series with the secondary side of the transformer and the load. To improve efficiency at larger load currents, a synchronous rectifier control circuit may modulate a transistor on the secondary side that is coupled in parallel with the diode using time-varying synchronous rectifier control signals. The synchronous rectifier control circuit may include circuitry that monitors voltage pulses on the transistor on the secondary side or that makes load current measurements using a resistor and voltage detector circuit.

Under low or no load conditions, synchronous rectification can be inhibited to improve efficiency. Under regular conditions when the load is being supplied with power by modulating the transistor on the primary side using the pulse width modulation control circuit, the synchronous rectifier control circuit may supply time-varying synchronous rectification control signals (pulses) to the transistor on the secondary side.

Further features of the invention, its nature and various advantages will be more apparent from the accompanying drawings and the following detailed description of the preferred embodiments.

DETAILED DESCRIPTION

The present invention relates to power converters and electronic devices that are powered by power converters.

Power converters, which are sometimes referred to as power adapters, are used to convert power levels and types. For example, a power converter may be used to boost or reduce a direct-current (DC) power level. Power converters may also be used to convert alternating current (AC) power into DC power. Power converters that are used in converting AC power to DC power are sometimes described herein as an example.

Figure 1:
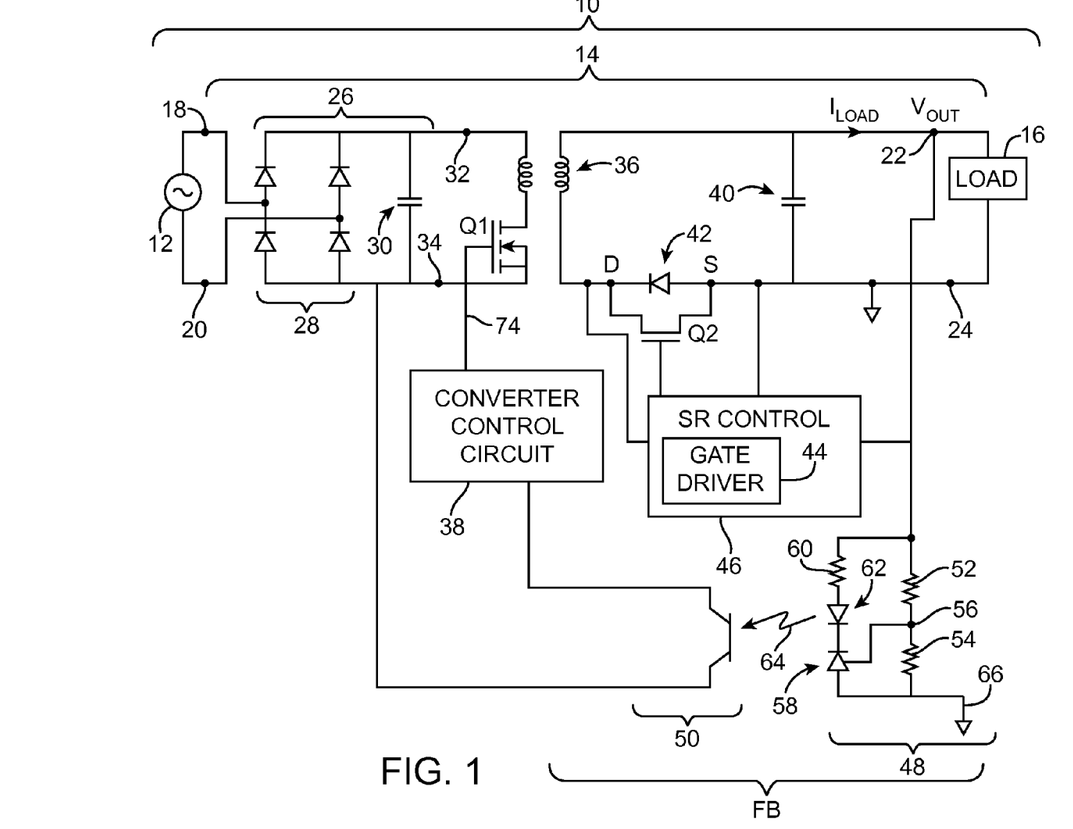
FIG. 1 is a schematic view of a system including a power converter with a synchronous rectifier output stage in accordance with an embodiment of the present invention.

An illustrative system environment in which an AC-to-DC power converter may operate is shown in FIG. 1. As shown in FIG. 1, system 10 may include a source of alternating current power such as AC power source 12. AC-to-DC power converter 14 may convert AC power from AC power source 12 to DC power. The DC power at the output of power converter 14 may be applied to a load such as load 16. Load 16 may be electronic equipment such as a computer, a cellular telephone, a music player, a set-top box, wireless router equipment, a display, or other electronic equipment. Load 16 may, if desired, include a battery that is charged by the DC power that is applied by AC-to-DC power converter 14.

In a typical scenario, power source 12 may be a source of AC line power such as a wall outlet. The AC power source may provide power at 120 volts or 240 volts (as examples). Circuitry in the power converter may convert the AC line power that is received at input terminals 18 and 20 into DC power at output terminals 22 and 24. The output voltage level may be 12 volts, 5 volts, or other suitable DC output level.

The circuitry in the power converter may be based on a switched mode power supply architecture. Switched mode power supplies use switches such as metal-oxide-semiconductor power transistors and associated control schemes such as pulse width modulation control schemes to implement power conversion functions in relatively compact circuits. In the example of FIG. 1, power converter 14 has a flyback converter architecture. Other power converter architectures may be sued for power converter 14 if desired.

Rectifier circuitry 26 of FIG. 1 may include a diode circuit such as rectifier circuit 28 and filter circuitry such as smoothing capacitor 30 for producing a DC voltage across terminals 32 and 34. Transformer 36 and transistor Q1 may be connected in series between terminal 32 and terminal 34 (i.e., transistor Q1 may be connected in series with the primary side of transformer 36).

Converter control circuit 38 may contain pulse width modulation (PWM) control circuitry or other suitable circuitry for pulsing transistor Q1 on and off (e.g., at a frequency of about 10 to 100 kHz). When Q1 is on, energy from the primary side of transformer 36 (i.e., the left-hand side of FIG. 1) is stored in the transformer. When Q1 is off, the stored energy is released from the secondary side of transfer 36 (i.e., the right-hand side of FIG. 1). This creates a desired DC voltage across terminals 22 and 24. Capacitor 40 or other filtering circuitry may be used in smoothing the DC output voltage across terminals 22 and 24.

To maximize power conversion efficiency in power converter 14, the secondary side of the power converter circuitry may contain a diode such as diode 42 in parallel with a transistor such as transistor Q2. Diode 42 will turn on whenever the voltage on terminal S rises to one diode turn-on voltage (about 0.7 volts) above the voltage on terminal D. Transistor Q2, which is used to implement a synchronous rectifier (SR) circuit that can operate in parallel with diode 42, may be actively controlled using gate driver circuitry 44 in SR control circuitry 46.

Diode 42 tends to be more efficient than synchronous rectifier transistor Q2 at low loads, but the use of transistor Q2 will generally be more efficient than diode 42 at high loads because the diode turn-on voltage is avoided. By activating transistor Q2 only during those times at which the amount of power delivery to load 16 is relatively high (i.e., by inhibiting application of time-varying synchronous rectifier control signals to transistor Q2 during no load conditions and very light load conditions), overall power efficiency for power converter circuitry 14 may be enhanced.

Power converter circuitry 14 may use feedback path circuitry FB to regulate converter control circuit 38. Any suitable feedback arrangement may be used in power converter circuitry 14 if desired. With the illustrative configuration shown in FIG. 1, circuit 48 and circuit 50 may form an electrically isolated portion of feedback path FB. Circuit 48 may be coupled between output voltage node 22 (at voltage Vout) and ground terminal 66 (which is shorted to output terminal 24). Resistors 52 and 54 may form a voltage divider that produces a voltage at node 56 that is proportional to output voltage Vout. The voltage on node 56 may be used to control shunt regulator 58. Light-emitting diode 62 may be coupled in series with resistor 60 and shunt regulator 58 between voltage Vout and ground 66.

Using circuit 48, light-emitting diode 62 may produce light 64 having an intensity that is proportional to the magnitude of output voltage Vout on terminal 22. Because light is used to convey signals from the secondary side of power converter 14 to the primary side of power converter 14, the secondary side of power converter 14 is isolated from high voltages. Photosensitive element 50 may convert the light signal from light-emitting diode 62 into a corresponding electrical signal that serves as a feedback signal for converter control circuit 38.

The voltage Vout can be regulated by making changes to the duty cycle of the PWM signal. When the value of Vout rises, the magnitude of signal 64 will tend to increase. In response, converter control circuit 38 may produce a pulse width modulation (PWM) control signal for the gate of transistor Q1 with a reduced duty cycle. This reduces the amount of energy transferred from the primary side of transformer 36 to the secondary side of transformer 36 as a function of time, thereby tending to lower Vout. If, on the other hand, the value of Vout starts to fall, the magnitude of signal 64 will tend to decrease. In this situation, converter control circuit 38 may increase the duty cycle of the PWM control signal for transistor Q1. In response to increases in the duty cycle of the PWM control signal, the amount of power transferred from the primary to the secondary side of transformer 36 will tend to increase, causing the value of Vout to rise. Using this type of feedback arrangement, power converter 14 can provide a steady value of Vout across terminals 22 and 24.

To reduce power losses under no-load (or very light load) conditions, control circuit 38 may support a low-frequency "burst" mode. In the burst mode, control circuit 38 may generate relatively few pulses, which reduces undesired power losses.

Figure 2:
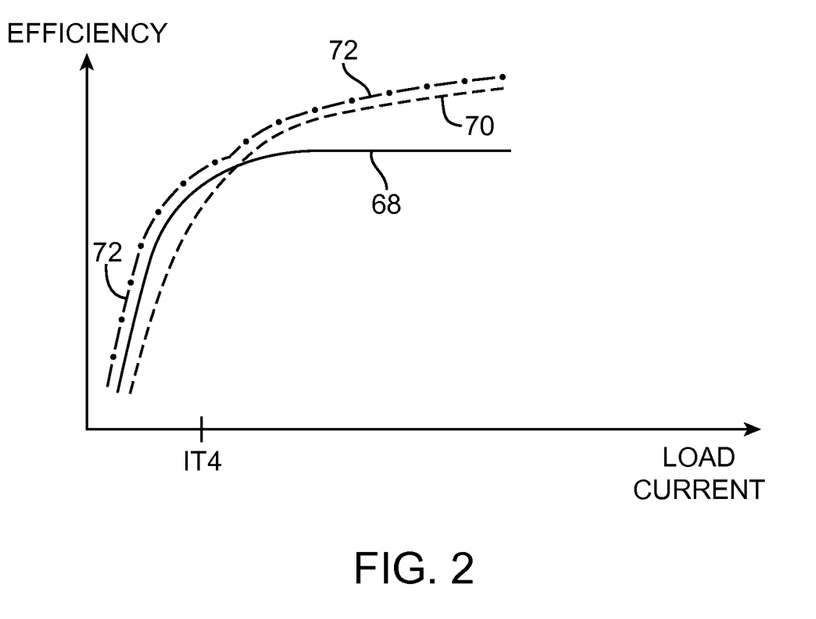
FIG. 2 is a graph showing how power converter efficiency varies as a function of load when using a diode and when using a synchronous rectifier circuit to perform rectification in the output stage of the power converter in accordance with an embodiment of the present invention.

FIG. 2 is a graph showing how the efficiency of diode 42 and transistor Q2 tend to vary as a function of load current Iload through load 16. At load current values below current ITH, the efficiency of diode 42 (line 68) tends to be greater than the efficiency of SR transistor Q2 At load current values above ITH, the efficiency of SR transistor Q2 tends to be greater than the efficiency of diode 42. By using circuitry that can monitor the amount of power draw by load 16 in real time, power converter 14 can be operated using diode 42 at load currents where diode 42 tends to be more efficient (i.e., by disabling transistor Q2 at load current values below a predetermined load current value of about ITH) and can be operated using transistor Q2 when use of transistor Q2 tends to be more efficient. Line 72 shows the efficiency that will result from using this type of hybrid control scheme.

When power converter 14 is converting minimal AC power into DC power (e.g., because load 16 is not present or because the amount of load current Iload that is required by load 16 is very low), converter control circuit 38 can enter the "burst mode" in which relatively few PWM pulses are generated. This characteristic of the operation of power converter 14 may be exploited to detect whether power converter 14 is operating under "no load" (or very light load) conditions in which transistor Q2 should be disabled or is operating under normal conditions in which transistor Q2 should be actively turned on and off using control circuit 46.

Figure 3:
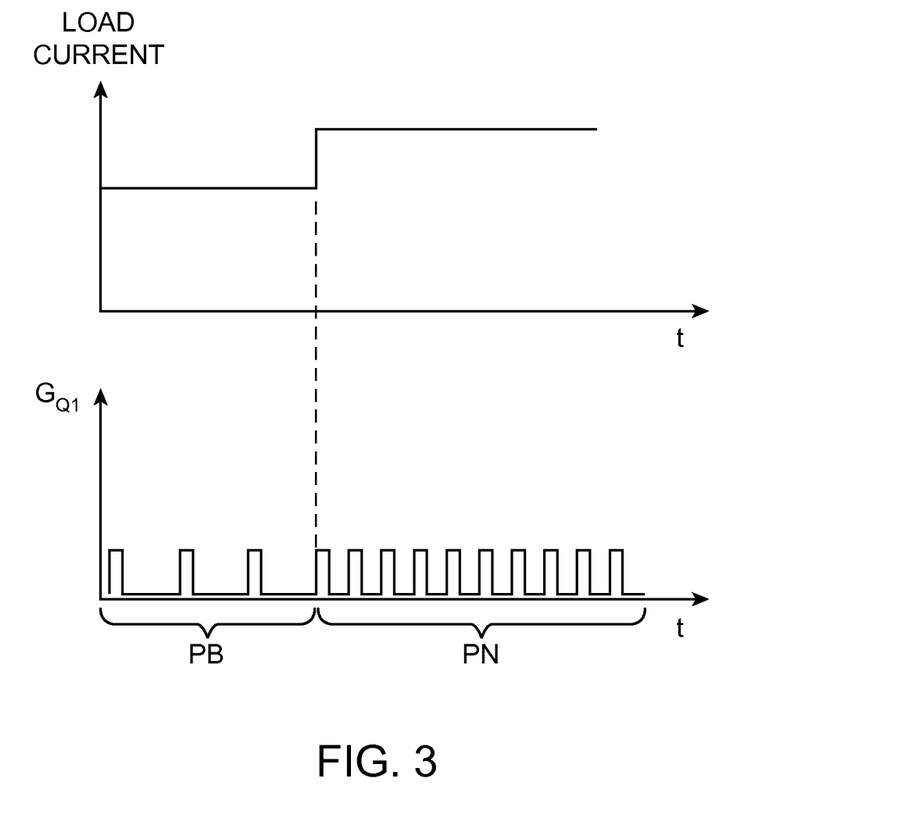
FIG. 3 contains graphs showing how a pulse width modulation controller may generate different numbers of current pulses on the primary side of a transformer in a power converter depending on the load current being drawn by a load that is coupled to the power converter in accordance with an embodiment of the present invention.

The upper trace of FIG. 3 shows how the load current drawn by load 16 may vary as a function of time. The lower trace of FIG. 3 shows an illustrative output signal that may be produced on output line 74 of converter control circuit 38 (e.g., the output of the PWM controller circuit for transistor Q1). During time period PB, PWM controller 38 is in a low-pulse-rate burst mode and is generating few pulses on line 74 (i.e., controller 38 is only generating burst mode pulses, so the interval between pulses is significantly larger than the pulse period during normal operations). During time period PN, PWM controller 38 is in a normal operating mode and is generating a sequence of PWM pulses at the PWM frequency (e.g., 50 kHz). During time period PN, the time period for each pulse is established by the PWM frequency (e.g., 50 kHz) and is therefore significantly shorter than the time separation between the successive burst mode pulses produced during time period PB.

Figure 4:
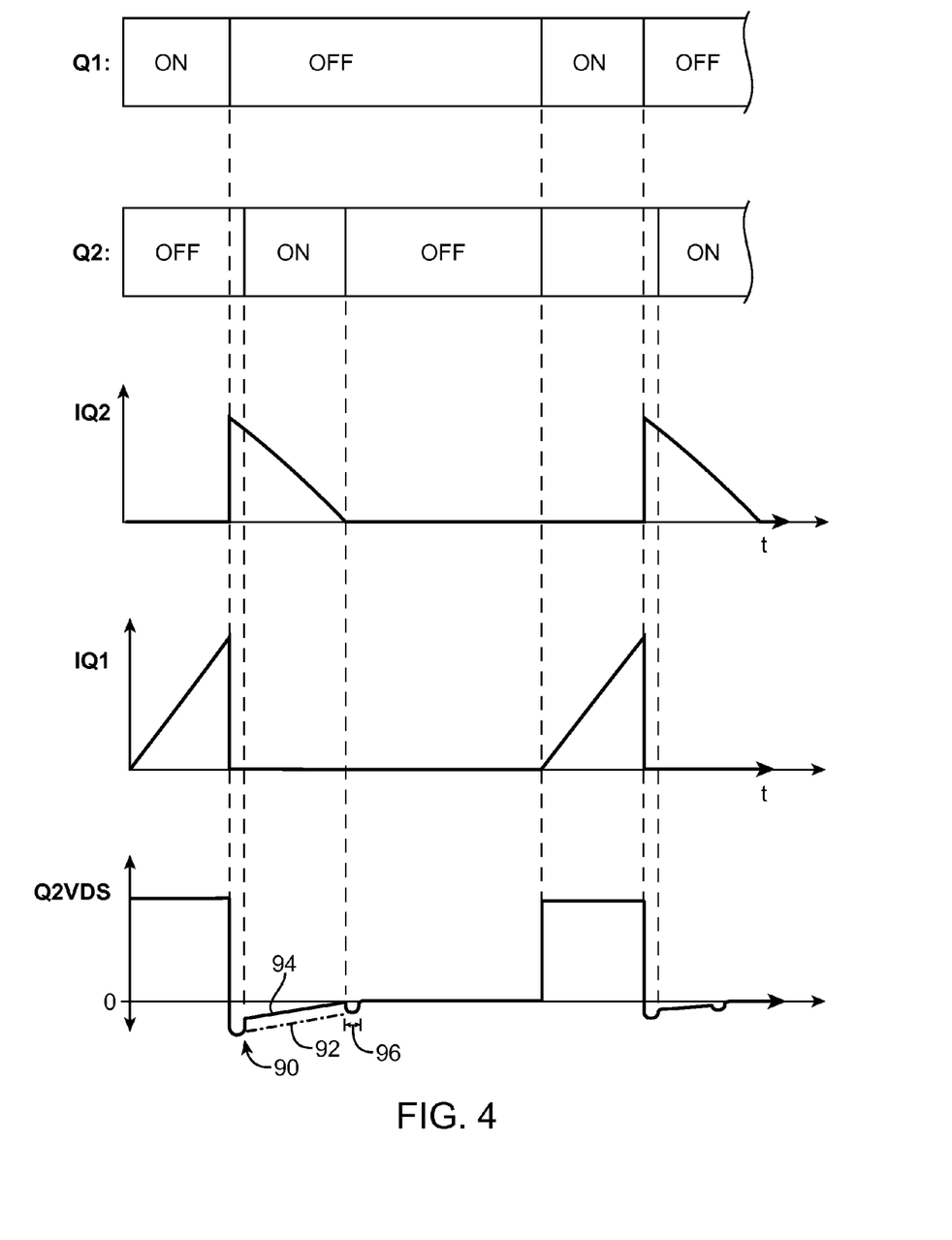
FIG. 4 includes graphs of signals involved in operating a power converter of the type shown in FIG. 1 in accordance with an embodiment of the present invention.

FIG. 4 shows how current pulses associated with Q1 on the primary side of converter 14 that are produced by applying control signals to the gate of Q1 with PWM converter control circuit 38 may result in detectable voltage pulses across the source-drain terminals of transistor Q2 on the secondary side of converter 14.

As shown in the first row of FIG. 4, transistor Q1 may be pulsed on and off by converter control circuit 38 (i.e., control circuit 38 may produce control pulses on the gate of transistor Q1). When Q1 is on, Q2, which is controlled by control circuit 46 (i.e., control circuitry that can turn Q2 on when a voltage drop across diode 42 is detected), is generally off, as shown in the second row of FIG. 4. The forth row of FIG. 4 shows how the process of turning on transistor Q1 gives rise to a source-drain current IQ1 that ramps up in proportion to the amount of time that transistor Q1 is on. This stores energy in transformer 36. When transistor Q1 is turned off, the energy is released into the secondary side of power converter 14, resulting in a source-drain current IQ2 through transistor Q2, as shown in the third row of FIG. 4.

The fifth row of FIG. 4 shows how the source-drain voltage of transistor Q2 (i.e., the voltage between source-drain terminal S and source-drain terminal D of transistor Q2) varies as a function of time. During periods of time in which transistor Q1 is on and Q2 is off, the voltage Q2VDS is generally stable and positive. When transistor Q1 is turned on and current IQ2 rises at time T1, the voltage across transistor Q2VDS becomes negative (see, signal portion 90 of FIG. 4). Line 92 represents the characteristic that voltage Q2VDS would have if transistor Q2 were to remain off. When synchronous rectifier functions are engaged, SR control circuitry 46 can detect when there is a forward bias across diode 42 and transistor Q2 and can use gate driver 44 to actively turn transistor Q2 on (i.e., control circuitry 46 can implement synchronous rectification). In this situation, the magnitude of voltage Q2VDS will minimized, as shown by line segment 94 (i.e., the voltage values associated with line segment 94 are reduced relative to the voltage values associated with line segment 92 because transistor Q2 is on). This reduced voltage drop improves efficiency in the secondary side of the power converter, because the relatively large voltage drop through diode 42 is avoided. Signal portion 96 corresponds to the small amount of voltage that results as control circuitry 46 detects that transistor Q2 should be turned off, resulting in transistor Q2 being turned off and residual current being carried through diode 42.

To enhance efficiency, control circuitry 46 may ascertain the amount of load current associated with load 16 in real time and may activate and deactivate the synchronous rectification functions of power converter 14 accordingly. As described in connection with FIG. 2, efficiency can be enhanced by activating synchronous rectification functions under relatively larger load current conditions and deactivating synchronous rectification functions (and therefore relying on diode 42) under relatively lower load current conditions (including no load conditions). Control circuitry 46 can determine the amount of load current that is being drawn by load 16 directly or indirectly. For example, control circuitry 46 can directly measure load current using a sampling resistor and voltage detector. Control circuitry 46 can indirectly ascertain the load current by monitoring the secondary side signal pulses corresponding to the primary side PWM control pulses. Determining the number of signal pulses that are produced per unit time allows control circuitry 46 to determine whether converter 14 is in burst mode (low load) or normal (high load) operation.

Figure 5:
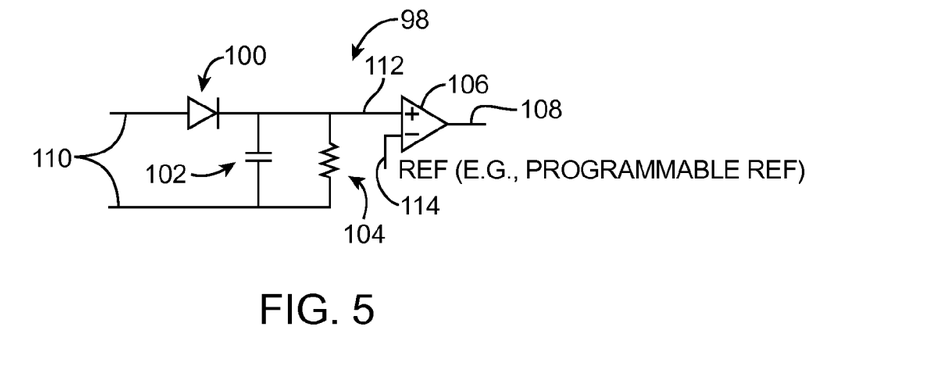
FIG. 5 is a diagram of an illustrative circuit having averaging circuitry and a comparator that compares time-averaged voltage signal values to a reference and that may be used in counting pulses associated with a pulse width modulation controller in a power converter and thereby ascertaining the amount of power being delivered to a load in accordance with an embodiment of the present invention.

With one suitable arrangement, the number of PWM control pulses that are being produced during operation of converter 14 can be monitored using a monitoring circuit of the type shown in FIG. 5. As shown in FIG. 5, monitoring circuitry 98 (e.g., circuitry incorporated into SR control circuit 46) may include a diode such as diode 100 and a filter circuit (e.g., a low-pass filter) made up of components such as capacitor 102, and resistor 104 (as an example). Terminals 110 may be coupled between terminals D and S of transistor Q2. Signal pulses on transistor Q2 (i.e., signal pulses related to turning transistor Q1 on and off on the primary side, as described in connection with FIG. 4) are passed to the filter circuit and are time-averaged to produce a corresponding direct-current (DC) voltage that is proportional to the number of pulses per unit time at transistor Q2. The DC voltage level on input 112 of comparator 106 may be compared to a reference voltage REF on input 114 of comparator 106. Reference voltage REF may have any suitable magnitude and may be a programmable reference provided by circuit 48 or other circuitry in converter 14. Comparator 106 may compare the signals on lines 112 and 114 and may produce a corresponding output signal on output line 108.

The DC voltage on input 112 may be proportional to the number of pulses (on/off cycles) of transistor Q1, and may therefore be used to determine whether converter 14 is in burst mode PB or normal mode PN. If few pulses are produced per unit time (i.e., if converter 14 is being operated in burst mode), the DC voltage on input 112 will be less than threshold reference voltage REF and the output of comparator 106 on path 108 will be low (i.e., a logic zero value). If more pulses are produced per unit time (i.e., if converter 14 is being operated in a normal mode), the DC value on input 112 will be greater than threshold reference voltage REF and the output of comparator 106 will be high (i.e., a logic high value).

The value of output 108 may be used to control the synchronous rectification feature of converter 14. When output 108 is low, control circuit 46 can conclude that converter control circuit 38 is operating in burst mode, so control circuit 46 can deactivate the synchronous rectification function (i.e., by inhibiting the active on/off modulation of Q2 shown in FIG. 4 so that converter 14 operates without synchronous rectification). In response to determining that the output signal from output 108 is high, control circuit 46 can activate synchronous rectification (i.e., control circuit 46 can turn transistor Q2 on and off using a time-varying control signal to implement synchronous rectification). During synchronous rectification, control circuit 46 may monitor Q2VDS and turn on Q2 whenever a negative Q2VDS value is detected, as shown in FIG. 4.

Figure 6:
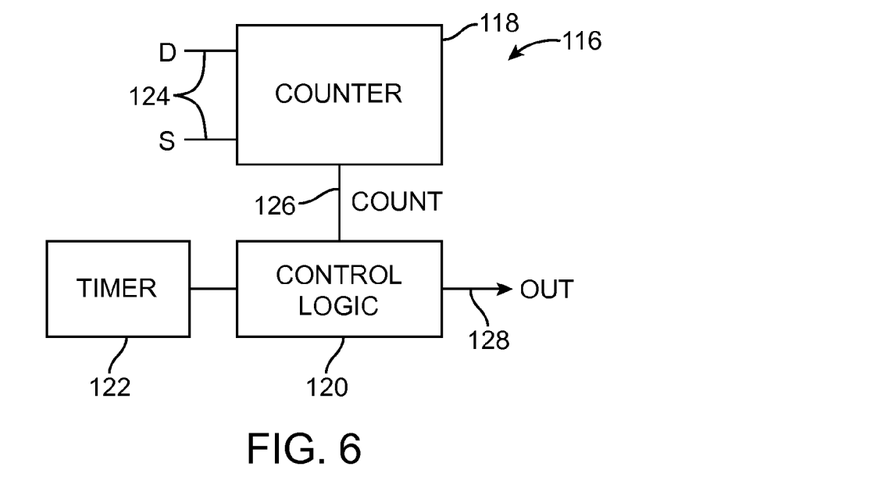
FIG. 6 is a diagram of an illustrative circuit based on a counter for counting pulses associated with a pulse width modulator controller in a power converter and thereby ascertaining the amount of power being delivered to a load in accordance with an embodiment of the present invention.

Another way in which PWM pulses can be monitored to ascertain the operating mode (and therefore the amount of load current that is being drawn through load 16) involves use of a pulse counting circuit such as counting circuit 116 of FIG. 6. As with circuitry 98 of FIG. 5, terminals 124 of circuitry 116 may be coupled between the drain and source terminals (sometimes referred to as source-drain terminals) of transistor Q2 to monitor voltage Q2VDS. Counter 118 may be used to count pulses across terminals D and S and may provide a count value COUNT to control logic 120 via path 126. Control logic 120 may obtain time information from a timer such as timer circuit 122.

Control logic 120 may use the pulse count information from counter 118 and the time information from timer circuit 122 to determine how many pulses are being produced by control circuit 38 per unit time. If the number of pulses per unit time is relatively low (e.g., if the pulse rate is below a predetermined threshold), indicating that control circuit 38 is being operated in burst mode, control circuit 120 may produce a first logic signal on output 128 (e.g., a low logic signal). In response to determining that the number of pulses per unit time is relatively high (e.g., in response to determining that the pulse rate and therefore the load current is above the predetermined threshold), control circuit 120 may produce a second logic signal on output 128 (e.g., a high logic signal). The output signal values on path 128 may be used by control circuitry 46 to activate or deactivate synchronous rectification, so that efficiency can be enhanced.

Figure 7:
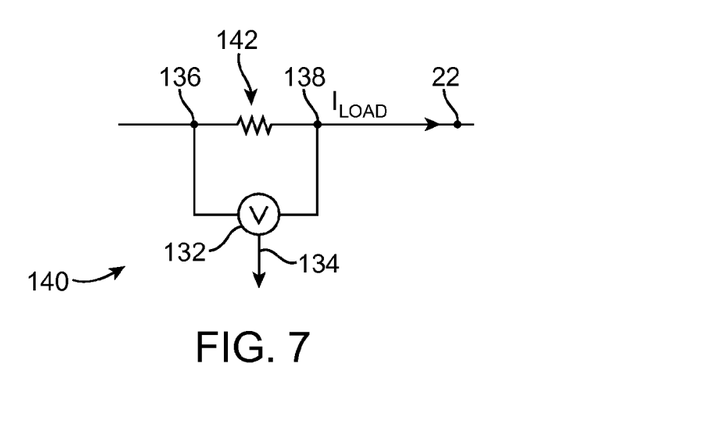
FIG. 7 is a diagram of an illustrative load current monitoring circuit that may be used in monitoring how much power is being delivered by a power converter to a load in accordance with an embodiment of the present invention.

If desired, load current Iload can be measured by control circuitry 46 by interposing a current measurement circuit within that output path of converter 14. This type of configuration is shown in FIG. 7. As shown in FIG. 7, load current measurement circuitry 140 may include a resistor such as resistor 142. Resistor 142 may be, for example, a low-resistance resistor such as a 0.1 ohm resistor. Resistor 142 may be placed within part of the load path such as a path leading to node 22 and load 16 (FIG. 1). As current Iload passes through resistor 142, a voltage drop proportional to Iload is generated between terminals 136 and 138. Voltage measurement circuitry 132 may measure the value of the voltage drop across terminals 136 and 138 and may produce an output on output line 134. The output may be, for example, a logic high value when the load current exceeds a predetermined threshold value and a logic low value when the load current is less than the predetermined threshold value. Control circuitry 46 may use the signal value on output 134 (i.e., information on the strength of Iload) to determine whether or not to use synchronous rectification. If it is determined that Iload is relatively high, control circuitry 46 may actively modulate transistor Q2 with time-varying gate control signals, as described in connection with FIG. 4. If it is determined that Iload is relatively low, control circuitry 46 may inhibit synchronous rectification (i.e., circuitry 46 may maintain transistor Q2 in an off state by applying no time-varying gate control signals to transistor Q2).

Figure 8:
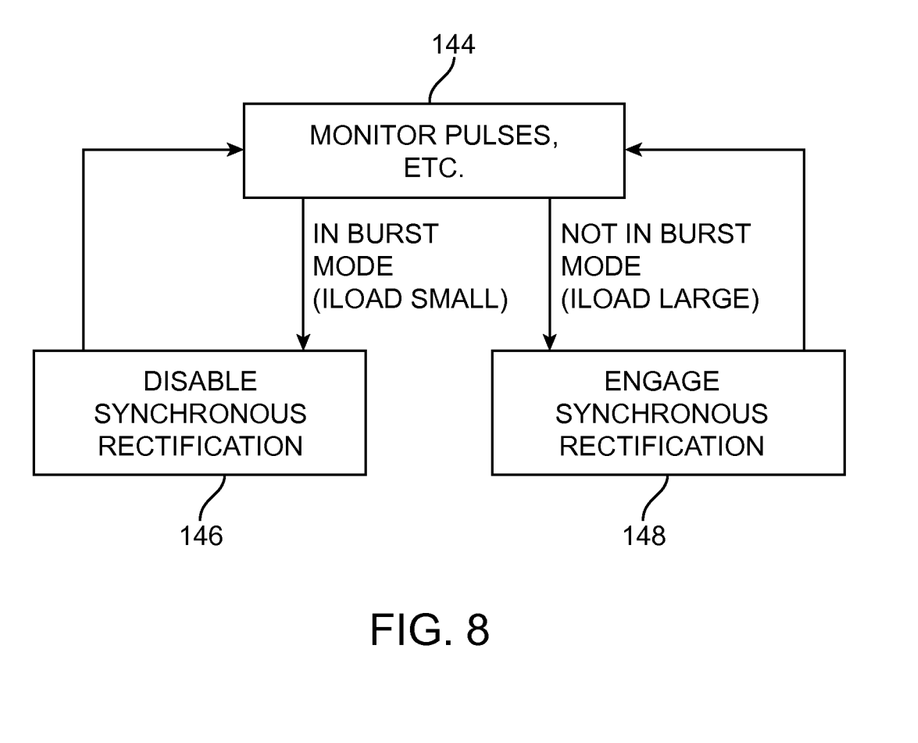
FIG. 8 is a flow chart of illustrative steps involved in operating a power converter with a synchronous rectifier stage in accordance with an embodiment of the present invention.

The illustrative circuitry of FIGS. 5, 6, 7, or other suitable circuitry may be used by synchronous rectifier control circuitry 46 in determining whether to disable or engage synchronous rectification in power converter 14. FIG. 8 shows illustrative steps involves in controlling power converter 14 during use at various different load levels. During the operations of FIG. 8, a user may connect and disconnect various loads such as load 16 from terminals 22 and 24 and may otherwise make adjustments to the circuitry coupled between terminals 22 and 24 that affects how much load current Iload is drawn by load 16. For example, a user of system 10 may turn on or off or otherwise adjust an electrical device that is coupled between terminals 22 and 24, the user may connect and disconnect one or more different devices, etc. In situations with normal active loads, it will be more efficient to use synchronous rectification in converter 14. In situations with no load 16 (or a very small load), it will be more efficient to disable synchronous rectification.

At step 144 of FIG. 8, power converter 14 may use circuitry 46 (e.g., circuitry of the type described in connection with FIGS. 5, 6, and/or 7), to determine the load current passing through load 16. Power converter 14 may, for example, determine how many PWM pulses are being produced per unit time, which is indicative of the load level for converter 12, or may measure Iload directly.

In response to determining that Iload is below a predetermined threshold (i.e., in response to determining that the pulse count per unit time is smaller than a predetermined value or that the directly measured value of Iload is below a predetermined value), control circuitry 46 may disable synchronous rectification (step 146). Processing may then loop back to step 144, for additional monitoring of the load status.

In response to determining that Iload is above a predetermined threshold (i.e., in response to determining that the pulse count per unit time is greater than a predetermined value or that the measured value of Iload is above a predetermined value), control circuitry 46 may engage synchronous rectification (step 148). Processing may then loop back to step 144, for additional monitoring of the load status.

The foregoing is merely illustrative of the principles of this invention and various modifications can be made by those skilled in the art without departing from the scope and spirit of the invention.

What is claimed is:

1. A power converter that converts alternating current (AC) power to direct current (DC) power for powering a load using a load current, comprising:
   a transformer having a primary side that receives an AC signal and having a secondary side;
   a first transistor coupled to the primary side;
   a first control circuit that controls the first transistor to provide a current through the primary side;
   a diode configured to couple in series with the load on the secondary side; a second transistor that bridges the diode; and a second control circuit that controls the second transistor, the second control circuit comprising a pulse counting circuit to count a number of pulses per unit time in the first and second transistors, wherein the second control circuit is configured to perform synchronous rectification operations using the second transistor and is configured to inhibit the synchronous rectification operations based at least partly on information on the load current, the information on the load current comprising a voltage proportional to the number of pulses per unit time in the first and second transistors.

2. The power converter defined in claim 1 wherein the second transistor has first and second source-drain terminals and wherein the pulse counting circuitry comprises a pulse counter coupled between the first and second source-drain terminals.

3. The power converter defined in claim 1 wherein the second transistor has first and second source-drain terminals and wherein the pulse counting circuitry comprises a filtering circuit coupled between the first and second source-drain terminals and a comparator having a first input coupled to the filtering circuit and a second input coupled to a source of a reference signal.

4. The power converter defined in claim 1 wherein the second control circuit comprises a current measurement circuit configured to measure the load current.

5. The power converter defined in claim 4 wherein the current measurement circuit comprises a resistor and wherein the load current passes through the resistor.

6. The power converter defined in claim 1 further comprising:
an output voltage terminal; and
feedback circuitry coupled between the output voltage terminal and the first control circuit.

7. The power converter defined in claim 6 wherein the feedback circuitry comprises a light source and a light detector that receives light from the light source.

8. The power converter defined in claim 7 wherein the feedback circuitry comprises a voltage divider that receives an output voltage from the output voltage terminal and wherein the light source receives signals from the voltage divider.

9. The power converter defined in claim 8 wherein the first transistor has a gate and wherein the first control circuit comprises a pulse width modulation control circuit configured to supply control signals to the gate.

10. The power converter defined in claim 1 wherein the first transistor comprises a gate and wherein the first control circuit comprises a pulse width modulation control circuit configured to supply control signals to the gate.

11. The power converter defined in claim 1 further comprising:
an input that supplies the AC signal to the primary side of the transformer; and
rectification circuitry coupled between the input and the transformer.

12. The power converter defined in claim 1 wherein the second transistor comprises a metal-oxide-semiconductor transistor.

13. A power converter that converts alternating current (AC) power to direct current (DC) power for powering a load, comprising:
an input that receives an AC signal;
a transformer having a primary side that receives power from the AC signal and a secondary side that delivers power to the load;
a first transistor coupled in series with the transformer on the primary side;
a pulse width modulation control circuit that controls the first transistor to provide a current through the primary side;
at least first and second output terminals on the secondary side that are configured to couple to the load;
a diode coupled in series with the transformer on the secondary side, wherein the diode has first and second terminals;
a second transistor having a first terminal coupled to the first terminal of the diode and having a second terminal coupled to the second terminal of the diode, wherein the second transistor has a gate terminal; and
a synchronous rectification control circuit comprising a counting circuitry for counting a number of voltage pulses per unit time between the first terminal of the second transistor and the second terminal of the second transistor, the synchronous rectification control circuit configured to apply time-varying synchronous rectification control signals to the gate terminal of the second transistor in response to a determination that a load current of more than a predetermined amount is being applied to the load, and the synchronous rectification control circuit is configured to inhibit application of the time-varying synchronous rectification control signals to the gate terminal of the second transistor in response to a determination that a load current of less than or equal to the predetermined amount is being applied to the load, wherein the determination that the load current is less than or equal to the predetermined amount is based on the number of voltage pulses per unit time counted by the counting circuitry.

14. The power converter defined in claim 13 wherein the circuitry for counting the voltage pulses comprises a pulse counter coupled between the first and second terminals of the second transistor.

15. The power converter defined in claim 13 wherein the synchronous rectification control circuit comprises circuitry that time-averages voltage signals between the first and second terminals of the second transistor to produce a corresponding direct-current voltage.

16. The power converter defined in claim 13 wherein the synchronous rectification control circuit comprises a current measurement circuit configured to measure load current values associated with load current flowing between the first and second output terminals.

17. A method of operating a power converter, comprising:
with a pulse width modulation controller and a first transistor, applying signal pulses to a primary side of a transformer;
on a secondary side of the transformer, applying an output voltage to output terminals, wherein the output terminals are configured to couple to a load;
in a first mode of operation, applying time-varying synchronous rectification control signals from a control circuit to a gate of a second transistor that is coupled in parallel with a diode, wherein the diode is coupled in series with the secondary side of the transformer;
in a second mode of operation, inhibiting the application of the time-varying synchronous rectification control signals to the gate of the second transistor with the control circuit;
with the control circuit, detecting voltages associated with the second transistor that arise from applying the signal pulses to the primary side of the transformer; and
with the control circuit, selecting between the first mode of operation and the second mode of operation according to a number of pulses per unit time at the second transistor.

18. The method defined in claim 17 wherein inhibiting application of the time-varying synchronous rectification control signals comprises:
inhibiting application of the time-varying synchronous rectification control signals in response to determining that the detected voltages associated with the second transistor correspond to a number of the signal pulses per unit time that is less than a predetermined threshold.

19. The method defined in claim 17, wherein the selecting between the first mode of operation and the second mode of operation according to a number of pulses per unit time at the second transistor comprises comparing a voltage proportional to the number of pulses per unit time at the second transistor with a reference voltage in a comparator circuit.

20. The method defined in claim 17, wherein the selecting between the first mode of operation and the second mode of operation according to a number of pulses per unit time at the second transistor comprises counting the number of pulses per unit time using a pulse counting circuit.

* * * * *